United States Patent
Chen et al.

(10) Patent No.: US 11,277,891 B2
(45) Date of Patent: Mar. 15, 2022

(54) CONTROL METHOD AND CONTROL CIRCUIT OF ELECTRONIC BALLAST OF GAS DISCHARGE LAMP (HID)

(71) Applicant: SHENZHEN NUMBER ENERGY SAVING CORPORATION, Guangdong (CN)

(72) Inventors: Hongchuan Chen, Guangdong (CN); Shengqiu Zhao, Guangdong (CN); Rizhan He, Guangdong (CN); Jiaqin Li, Guangdong (CN)

(73) Assignee: SHENZHEN NUMBER ENERGY SAVING CORPORATION, Guangdong (CN)

( * ) Notice: Subject to any disclaimer, the term of this patent is extended or adjusted under 35 U.S.C. 154(b) by 0 days.

(21) Appl. No.: 17/204,329

(22) Filed: Mar. 17, 2021

(65) Prior Publication Data

US 2021/0204372 A1 Jul. 1, 2021

Related U.S. Application Data

(63) Continuation of application No. PCT/CN2020/072482, filed on Jan. 16, 2020.

(30) Foreign Application Priority Data

Nov. 15, 2019 (CN) .......................... 201911117535.6

(51) Int. Cl.
*H05B 41/392* (2006.01)
*H05B 41/288* (2006.01)

(52) U.S. Cl.
CPC ..... *H05B 41/3928* (2013.01); *H05B 41/2888* (2013.01)

(58) Field of Classification Search
CPC .... H05B 41/16; H05B 41/24; H05B 41/2806; H05B 41/288; H05B 41/3928; H05B 41/2888; H05B 41/392
See application file for complete search history.

(56) References Cited

U.S. PATENT DOCUMENTS

| 2004/0183463 | A1 | 9/2004 | Sun et al. |
| 2018/0077784 | A1 | 3/2018 | Fietzek et al. |
| 2020/0337126 | A1* | 10/2020 | Chen .................. H05B 41/24 |

FOREIGN PATENT DOCUMENTS

| CN | 202738233 U | 2/2013 |
| CN | 103152958 A | 6/2013 |

(Continued)

*Primary Examiner* — Henry Luong
(74) *Attorney, Agent, or Firm* — Greenblum & Bernstein, P.L.C.

(57) ABSTRACT

A control method of an electronic ballast of a gas discharge lamp (HID), to generate a PWM1 signal for controlling on/off of a left upper arm switch, a PWM2 signal for controlling on/off of a right upper arm switch, a PWM3 signal for controlling on/off of a left lower arm switch, and a PWM4 signal for controlling on/off of a right lower arm switch, the PWM1 signal and the PWM3 signal are low frequency signals and have an identical frequency and an opposite phase, the PWM2 signal and the PWM4 signal are high frequency signals. Duty ratios of PWM signals for controlling arms of a semiconductor full bridge circuit are changed according to a power consumption of the gas discharge lamp (HID) to control the power consumption of the gas discharge lamp (HID).

16 Claims, 2 Drawing Sheets

(56) References Cited

FOREIGN PATENT DOCUMENTS

| | | | | | |
|---|---|---|---|---|---|
| CN | 108337795 | A | * | 7/2018 | |
| CN | 108337795 | A | | 7/2018 | |
| CN | 109982494 | A | * | 7/2019 | .......... H02M 1/4208 |
| CN | 109982494 | A | | 7/2019 | |
| CN | 209914141 | U | * | 1/2020 | |
| CN | 209914141 | U | | 1/2020 | |
| KR | 10-2009-0124729 | A | | 12/2009 | |

* cited by examiner

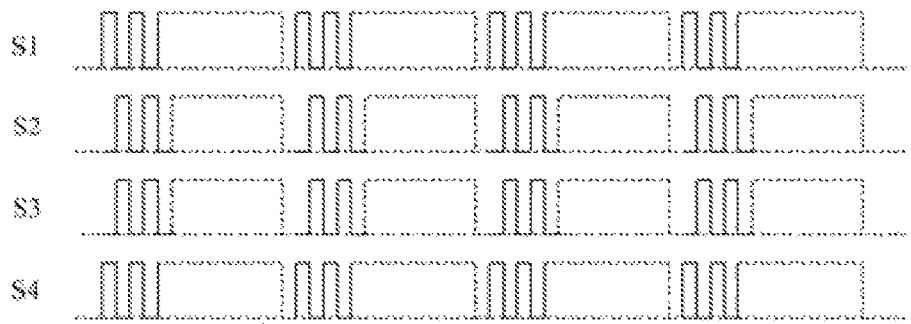
Fig. 1     PRIOR ART
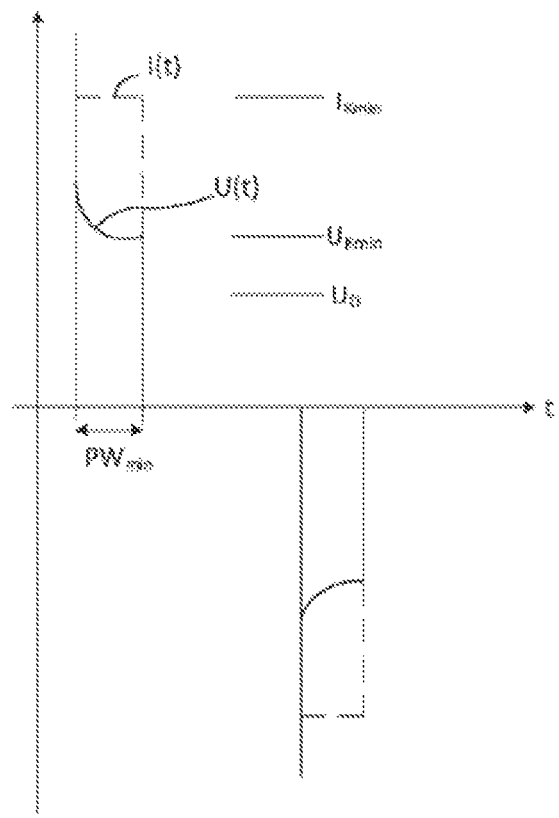
Fig. 2     PRIOR ART

CONTROL METHOD AND CONTROL CIRCUIT OF ELECTRONIC BALLAST OF GAS DISCHARGE LAMP (HID)

FIELD

The present disclosure relates to the field of ballast, and in particular to a control method and a control circuit of an electronic ballast of a high pressure gas discharge lamp (HID).

BACKGROUND

At present, there are more and more applications of electronic ballasts, including electronic ballasts for high pressure gas discharge lamp (HID) in the field of lighting. The core of an electronic ballast is an inverter consisting of a semiconductor full bridge (FB) circuit with four semiconductor switches S1/S2/S3/S4. The on/off control of the four semiconductor switches S1/S2/S3/S4 of the inverter realizes the conversion of DC into AC at both sides of a high pressure gas discharge lamp (HID).

In practice, a controller generates FWM signals to control the on/off of the four semiconductor switches S1/S2/S3/S4 in a certain time sequence. FIG. 1 illustrates a time sequence diagram of PWM signals generated by a control device to control the on/off of the four semiconductor switches S1/S2/S3/S4. As shown in FIG. 1, a first synchronous PWM signal is used for two diagonal switches S1 and S4, and a second synchronous PWM signal is used for switches S2 and S3. A phase difference between the first synchronous PWM signal and the second synchronous PWM signal is 180 degrees. Such control signals realize an interactive conduction at both ends of a high pressure gas discharge lamp (HID). That is, during the first half of a cycle, the switches S1 and S4 are conducted, so that the high pressure gas discharge lamp (HID) is conducted in one direction. During the second half of the cycle, the switches S2 and S3 are conducted, so that the high pressure gas discharge lamp (HID) is conducted in an opposite direction. That is to say, the high pressure gas discharge lamp (HID) is always conducted. Energy saving control cannot be realized with such a control method. In order to reduce the energy consumption of the high pressure gas discharge lamp (HID), various energy-saving ballast control methods have been designed in the field. The Chinese patent No. CN 107820358 B discloses a control method of an electronic dimming ballast of a UV lamp. In such a method, as shown in FIG. 2, the voltage and the current change over time. The output current I and the voltage U are substantially rectangular with a frequency of about 65 kHz. With the absence of a common choke coil, the current signal I and the voltage signal U have substantially the same shape. The power, or more precisely the effective current I is controlled by pulse width modulation (PWM).

During the rated operation, the voltage amplitude shall be equal to the discharge voltage $U_D$ of the lamp. If the combustion voltage U is higher than the discharge voltage $U_D$, nearly no UV power is generated, and energy is lost by heating.

As shown in FIG. 2, at the beginning of the pulse, the voltage increases in a short period of time until it drops to the predetermined level $U_{kmin}$ in the remaining pulse length, which produces a peak and then reaches a plateau. The given current $I_{kmin}$, causes the operating voltage U to drop to $U_{kmin}$. This mode produces an invalid current to voltage ratio, in which an excessive current is used for cathode heating.

There are two preferable control methods for an electronic ballast unit. The control variable is UV power, in order to reduce the UV power, the current drops to $I_{kmin}$ and remains at this level. Thereafter, the voltage amplitude increases until a desired UV power is achieved. With the increase of the voltage amplitude, the pulse width is reduced until reaching $PW_{min}$. In this way, part of the energy is used to heat the cathode, which extends the life of the UV lamp without the need of additional heat sources.

However, a control circuit to realize such a control mode is very complex, which is not suitable for a high pressure gas discharge lamp (HID).

SUMMARY

Since the existing control process of an electronic ballast is complicated and cannot meet the needs of users, a control method and a control circuit of an electronic ballast of a high pressure gas discharge lamp (HID) are provided in the present disclosure.

The technical solution adopted by the present disclosure to achieve the technical objectives is: a control method of an electronic ballast of a gas discharge lamp (HID), to generate PWM signals for controlling a left upper arm switch S1, a right upper arm switch S2, a left lower arm switch S3 and a right lower arm switch S4 of the ballast, wherein the gas discharge lamp (HID) is disposed between a connection point of a left upper arm and a left lower arm and a connection point of a right upper arm and a right lower arm;

wherein during a normal operation of the electronic ballast, an operation of a controller comprises following steps:

S1: generating the PWM signals; wherein the controller generates a. PWM1 signal for controlling on/off of the left upper arm switch S1, a PWM2 signal for controlling on/off of the right upper arm switch S2, a PWM3 signal for controlling on/off of the left lower arm switch S3, and a PWM4 signal for controlling on/off of the right lower arm switch S4; the PWM1 signal and the PWM3 signal are low frequency signals and have an identical frequency and an opposite phase, the PWM2 signal and the PWM4 signal are high frequency signals;

S2: controlling to filter an electrical signal input to the gas discharge lamp (HID);

S3: detecting a current input into the gas discharge lamp (HID); and

S4: adjusting duty ratios of the PWM2 signal and the PWM4 signal; wherein, if the current input into the gas discharge lamp (HID) is detected to be greater than a set normal value, the duty ratios of the PWM2 signal and the PWM4 signal are reduced, and if the current input into the gas discharge lamp (HID) is detected to be less than the set normal value, the duty ratios of the PWM2 signal and the PWM4 signal are increased; if the current input into the gas discharge lamp (HID) is detected to be greater than a set maximum value, the left upper arm switch S1, the right upper arm switch S2, the left lower arm switch S3 and the right lower arm switch S4 are all disconnected.

In a control method of an electronic ballast provided in the present disclosure, the duty ratios of PWM signals for controlling lower arms of a semiconductor full bridge circuit are changed according to a power consumption of a gas discharge lamp (HID) to control the power consumption of the gas discharge lamp (HID).

Further, before S1 of the control method of the electronic ballast of the gas discharge lamp (HID), the control method also comprises:

S0: a step of starting-up, wherein the controller generates a high frequency PWM01 signal for controlling the left upper arm switch S1 and the right lower arm switch S4 to be connected simultaneously or disconnected simultaneously, and a high frequency PWM02 signal for controlling the right upper arm switch S2 and the left lower arm switch S3 to be connected simultaneously or disconnected simultaneously, the PWM01 signal and the PWM02 signal have an identical frequency and a phase difference of 180°.

Further, in the above control method of the electronic ballast of the gas discharge lamp (HID), duty ratios of the PWM01 signal and the PWM02 signal are 50%.

Further, in the above control method of the electronic ballast of the gas discharge lamp (HID), the PWM01 signal and the PWM02 signal, and the PWM2 signal and the PWM4 signal have an identical frequency.

Further, in the control method of the electronic ballast of the gas discharge lamp (HID), frequencies of the PWM1 signal and the PWM3 signal are within 100 Hz, and frequencies of the PWM2 signal and the PWM4 signal are between 10 kHz and 100 kHz.

Also provided in the present disclosure is a control circuit of an electronic 2.5 ballast of a gas discharge lamp (HID), comprising a semiconductor full bridge circuit having the left upper arm switch S1, the right upper arm switch S2, the left lower arm switch S3 and the right lower arm switch S4 and a controller; wherein the gas discharge lamp (HID) is disposed between a connection point of a left upper arm and a left lower arm and a connection point of a right upper arm and a right lower arm;

wherein the controller comprises:

a PWM signal generation unit for generating the PWM1 signal for controlling on/off of the left upper arm switch S1, the PWM2 signal for controlling on/off of the right upper arm switch S2, the PWM3 signal for controlling on/off of the left lower arm switch S3, and the PWM4 signal for controlling on/off of the right lower arm switch S4 from the controller;

a unit for generating a control signal for controlling whether a high frequency filtering capacitor C2 is added to both ends of the gas discharge lamp (HID);

a collection unit for collecting an output of a detection circuit for detecting a current input into the gas discharge lamp (HID), and a unit for determining and setting the duty ratios of the PWM2 signal and the PWM4 signal.

In the present disclosure, a controller generates different PWM signals according to a detection of a power consumption of a gas discharge lamp (HID), so as to stabilize the power consumption of the gas discharge lamp (HID).

Further, in the above control circuit, the controller further comprises a high frequency PWM signal generator for generating a high frequency PWM01 signal for controlling the left upper arm switch S1 and the right lower arm switch S4 to be connected simultaneously or disconnected simultaneously, and a high frequency PWM02 signal for controlling the right upper arm switch S2 and the left lower arm switch S3 to be connected simultaneously or disconnected simultaneously.

Further, in the above control circuit, duty ratios of the PWM01 signal and the PWM02 signal are 50%.

Further, in the above control circuit, the PWM01 signal and the PWM02 signal, and the PWM2 signal and the PWM4 signal have an identical frequency.

Further in the above control circuit, frequencies of the PWM1 signal and the PWM3 signal are within 100 Hz, and frequencies of the PWM2 signal and the PWM4 signal are between 10 kHz and 100 kHz.

A further explanation of the present disclosure with reference to drawings and specific embodiments is provided as follows.

BRIEF DESCRIPTION OF THE DRAWINGS

FIG. 1 illustrates a time sequence control diagram of an existing normal ballast.

FIG. 2 illustrates a time sequence control diagram of an electronic dimming ballast of a UV lamp disclosed in the Chinese Patent No. CN 107820358 B.

DETAILED DESCRIPTION

Figure 3:
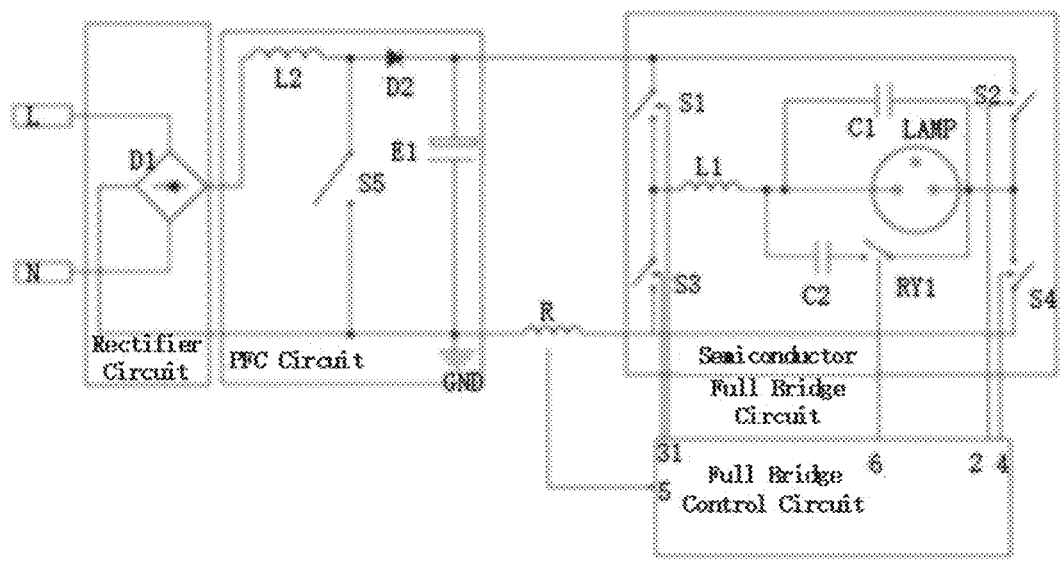
FIG. 3 illustrates a schematic circuit diagram of an electronic ballast of a gas discharge lamp (HID) used in the present disclosure.

Example 1, as shown in FIG. 3, is a novel electronic ballast with stable operation at high intensity discharge (HID), suppressed harmonics and high power factor (PFC). The electronic ballast of the present example uses an inverter control circuit to realize the control of a semiconductor full bridge circuit and to complete an inversion.

In the present example, after a 220 V AC commercial power is rectified by a PFC circuit, a 400 V DC is formed after being filtered in PFC, and then enters a semiconductor full bridge circuit consisting of four semiconductor switches S1/S2/S3/S4 to invert and form a high frequency alternating current, which enters a gas discharge lamp (HID). In the present example, a controller is used to control on/off of the four semiconductor switches S1/S2/S3/S4 according to a time sequence shown in FIG. 4, forming a high frequency alternating current at both sides of the lamp.

Figure 4:
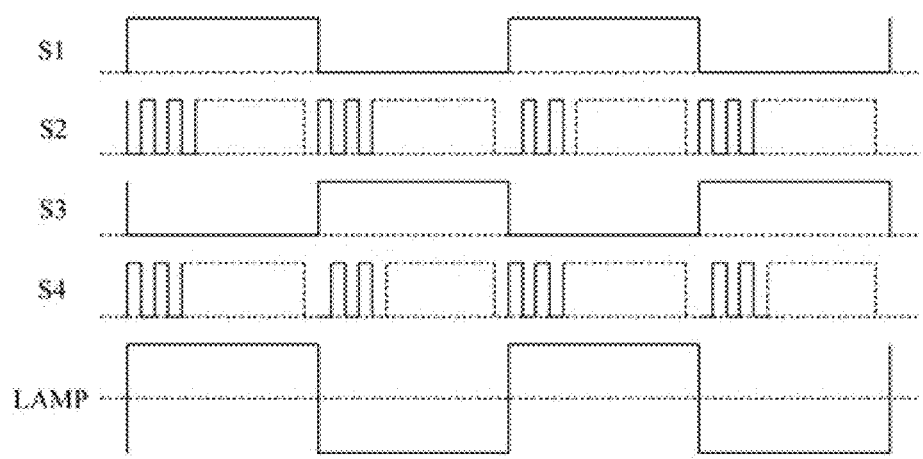
FIG. 4 illustrates a time sequence control diagram of an electronic ballast of a gas discharge lamp (HID) in the present disclosure.

In the present example, a time sequence adopted by the controller to control S1/S2/S3/S4 is shown in FIG. 4:

The controller generates a PWM1 signal for controlling on/off of the left upper arm switch S1, a PWM2 signal for controlling on/off of the right upper arm switch S2, a PWM3 signal for controlling on/off of the left lower arm switch S3, and a PWM4 signal for controlling on/off of the right lower arm switch S4. The PWM1 signal and the PWM3 signal are low frequency signals and have an identical frequency and an opposite phase. The frequencies of the PWM1 signal and the PWM3 signal are generally within 100 Hz. The duty ratios of the PWM1 signal and the PWM3 signal are generally 50%, which in fact can be adjusted as needed. The PWM2 signal and the PWM4 signal are high frequency signals and generally have frequencies between 10 kHz and 100 kHz, which can be adjusted as needed in practice.

During a normal working process of the lamp, the controller also monitors the power consumption of the lamp. As shown in FIG. 3, a detection resistance R is provided in the circuit. The controller samples a voltage at both ends of the resistance R with a sampling circuit, and calculates the power consumption of the lamp. In practice, if the lamp works for a long time, it generates heat, discharges more electricity with excitation of gas, and the resistance is relatively reduced. Where the voltage remains unchanged, the current increases and the power consumption increases, which generates heat and results in abnormal operation. Therefore, when the controller detects increase of power consumption of the lamp, it reduces the duty ratios of the PWM2 signal and the PWM4 signal to reduce the power consumption. The specific control process of a lamp during a normal operation is as follows:

S1: generating the PWM signals; wherein the controller generates a PWM1 signal for controlling on/off of the left upper arm switch S1, a PWM2 signal for controlling on/off of the right upper arm switch S2, a PWM3 signal for controlling on/off of the left lower arm switch S3, and a PWM4 signal for controlling on/off of the right lower arm switch S4; the PWM1 signal and the PWM3 signal are low frequency signals and have an identical frequency and an opposite phase, the PWM2 signal and the PWM4 signal are high frequency signals;

S2: controlling to filter an electrical signal input into the gas discharge lamp (HID);

S3: detecting a current input into the gas discharge lamp MID), and

S4: adjusting duty ratios of the PWM2 signal and the PWM4 signal; wherein if the current input into the gas discharge lamp (HID) is detected to be greater than a set normal value, the duty ratios of the PWM2 signal and the PWM4 signal are reduced, and if the current input into the gas discharge lamp (HID) is detected to be less than the set normal value, the duty ratios of the PWM2 signal and the PWM4 signal are increased; if the current input into the gas discharge lamp (HID) is detected to be greater than a set maximum value, the left upper arm switch S1, the right upper arm switch S2, the left lower arm switch S3 and the right lower arm switch S4 are all disconnected.

A control circuit of the electronic ballast of the gas discharge lamp in the present example is shown in FIG. 3. After a 220 V AC input voltage is rectified by a rectifier bridge D1 consisting of four diodes, and then filtered by a PFC circuit consisting of an inductance L2, a diode D2, an electrolytic capacitor E1 and a switch S5, a 400 VDC is formed and output to a semiconductor full bridge circuit consisting of four semiconductor switches S1/S2/S3/S4. Under control of a controller, the switches are connected or disconnected according to a specified time sequence. In addition, a resonant inductor L1 in series, a high frequency resonant capacitor C1 in series, and a high frequency filtering capacitor C2 in parallel are provided between the semiconductor full bridge circuit and the lamp. Whether the high frequency filtering capacitor C2 is provided depends on a relay RY1 controlled by the controller. The semiconductor full bridge circuit is provided with the DC power from the PFC. The PFC circuit filters an output of the previous rectifier bridge D1 to form the 400 VDC.

In the present example, a voltage value between both ends of R is detected by current and input to an inverter controller. After being processed, time sequence signals for controlling the four semiconductor switches S1/S2/S3/S4 in the semiconductor full bridge (FB) circuit are generated. In the present example, the inverter controller is an intelligent chip, which integrates internally a processor, memory, AD converter, etc. In practice, a special single chip microcomputer is widely used in the applicant's various grow lighting systems. In the present example, the four semiconductor switches S1/S2/S3/S4 can all adopt MOS transistors. D-S poles of the MOS transistors constitute one arm of the semiconductor full bridge (FB) circuit. G-poles are connected with the chip of the inverter control circuit U1, and the chip of the inverter control circuit U1 generates a signal containing alternating elements to control its disclosure. In practice, PWM signals with different frequencies and different duty ratios are produced in the controller. For example, when starting up, the controller generates a high frequency PWM01 signal for controlling the left upper arm switch S1 and the right lower arm switch S4 to be connected simultaneously or disconnected simultaneously, and a high frequency PWM02 signal for controlling the right upper arm switch S2 and the left lower arm switch S3 to be connected simultaneously or disconnected simultaneously; the PWM01 signal and the PWM02 signal have an identical frequency and a phase difference of 180°, and duty ratios of the PWM01 signal and the PWM02 signal are 50%. The two signals, PWM01 and PWM02, can be generated by a PWM signal generator with inverted phases before switching. During normal operation, the low frequency PWM1 signal and PWM3 signal are also PWM signals with the duty ratios of 50% and a phase difference of 180°, i.e. inverted phases. Therefore, a phase inverter needs to be added before the switch S1 or switch S2. In addition, the high frequency PWM2 signal and PWM4 signal with several different duty ratios can be generated by the PWM circuit. Generally, duty ratios of 30%, 20% and 10% are commonly used.

Under the control of the semiconductor full bridge circuit controller, the semiconductor switch S1 and the semiconductor switch S3, and the semiconductor switch S2 and the semiconductor switch S4 complement each other to conduct during a cycle. There is a conducting phase angle between the semiconductor switch S1 and the semiconductor switch S3, and between the semiconductor switch S2 and the semiconductor switch S4. An inverter control circuit chip U1 controls an output power by adjusting the conducting phase angle to realize an active power factor compensation (APFC) function.

In the present example:

high frequency resonant trigger device has advantages of continuous high voltage and high energy density, which is suitable for triggering various sodium lamps, metal halide lamps and ceramic metal halide lamps.

An ideal working waveform of the various sodium lamps, metal halide lamps and ceramic metal halide lamps is low frequency square wave, which can eliminate acoustic resonance. Therefore, the lamp switches to work in low frequency square wave after being triggered. In the present example, a rectification and filtering are carried out before the switches S1 to S4 to form a unified high voltage DC, and a square wave can be formed through the switches S1 to S4.

A lamp selection switch is designed for the ballast. A DSP module carries out different triggering voltages, power references and open/short circuit protection references according to a lamp selected by the switch.

The electronic ballast with a novel single-stage circuit structure of the present example was used in grow lighting system, which produced good results. At present, the electronic ballast of the present example can be used with both 50 Hz and 60 Hz commercial power and a voltage of 277 V, 240 V, 220 V, 208 V and 120 V The commercial power source is connected with the diode rectifier bridge D1. An output of the rectifier bridge D1 is filtered by the PFC circuit to form the 400 VDC, which is directly sent to the semiconductor full bridge circuit consisting of four semiconductor switches S1/S2/S3/S4.

The semiconductor full bridge circuit is divided into a left bridge arm and a right bridge arm. The left bridge arm consists of the semiconductor switch S1 of the left upper bridge arm and the semiconductor switch S3 of the left lower bridge arm. The right bridge arm consists of the semiconductor switch S2 of the right upper bridge arm and the semiconductor switch S4 of the right lower bridge arm. The semiconductor switch S1 of the left upper bridge arm and the semiconductor switch S3 of the left lower bridge arm are connected with two ports of the controller, respectively, i.e. the full bridge control circuit, and are also controlled by the two ports of the controller. The semiconductor switch S2 of the right upper bridge arm and the semiconductor switch S4 of the right lower bridge arm are connected to two ports of the controller, respectively, i.e. the full bridge control circuit, and are also controlled by two ports of the controller. The semiconductor switch S1 of the left upper bridge arm and the semiconductor switch S3 of the left lower bridge arm, and the semiconductor switch S2 of the right upper bridge arm and the semiconductor switch S4 of the right lower bridge arm complement each other to conduct during a cycle. There is a conducting phase angle between the semiconductor switch S1 of the left upper bridge arm and the semiconductor switch S4 of the right lower bridge arm, and between the semiconductor switch S2 of the right upper bridge arm and the semiconductor switch S3 of the left lower bridge arm. By controlling the size of the conducting phase angle, the current sent to the gas discharge lamp is controlled to be a rated current corresponding to a rated power of the lamp, and the current flowing into the lamp is neither too large nor too small. After sampled by the current detection sampling circuit, an output signal reflecting a magnitude of the current is processed and determined in the controller (single chip microcomputer), if the signal is greater than a normal set value, the PWM signals with relatively small duty ratios are selected to control the two switches, and if the detected signal continues to increase up to which is greater than a set maximum value, the four switches are disconnected to protect the lamp.

What is claimed is:

1. A control method of an electronic ballast of a gas discharge lamp (HID), to generate PWM signals for controlling a left upper arm switch, a right upper arm switch, a left lower arm switch, and a right lower arm switch of the electronic ballast, wherein the gas discharge lamp (HID) is disposed between a connection point of a left upper arm and a left lower arm and a connection point of a right upper arm and a right lower arm;
wherein during a normal operation of the electronic ballast, an operation of a controller of the electronic ballast comprises:
generating the PWM signals; wherein the controller generates a PWM1 signal for controlling on/off of the left upper arm switch, a PWM2 signal for controlling on/off of the right upper arm switch, a PWM3 signal for controlling on/off of the left lower arm switch, and a PWM4 signal for controlling on/off of the right lower arm switch; the PWM1 signal and the PWM3 signal are low frequency signals and have an identical frequency and an opposite phase, the PWM2 signal and the PWM4 signal are high frequency signals;
controlling to filter an electrical signal input into the gas discharge lamp (HID);
detecting a current input into the gas discharge lamp (HID); and
adjusting duty ratios of the PWM2 signal and the PWM4 signal; wherein if the current input into the gas discharge lamp (HID) is detected to be greater than a set normal value, the duty ratios of the PWM2 signal and the PWM4 signal are reduced, and if the current input into the gas discharge lamp (HID) is detected to be less than the set normal value, the duty ratios of the PWM2 signal and the PWM4 signal are increased; if the current input into the gas discharge lamp (HID) is detected to be greater than a set maximum value, the left upper arm switch, the right upper arm switch, the left lower arm switch and the right lower arm switch are all disconnected.

2. The control method of the electronic ballast of the gas discharge lamp (HID) of claim 1, wherein before generating the PWM signals, the control method further comprises:
starting-up, wherein the controller generates a high frequency PWM01 signal for controlling the left upper arm switch and the right lower arm switch to be connected simultaneously or disconnected simultaneously, and a high frequency PWM02 signal for controlling the right upper arm switch and the left lower arm switch to be connected simultaneously or disconnected simultaneously, the PWM01 signal and the PWM02 signal have an identical frequency and a phase difference of 180°.

3. The control method of the electronic ballast of the gas discharge lamp (HID) of claim 2, wherein duty ratios of the PWM01 signal and the PWM02 signal are 50%.

4. The control method of the electronic ballast of the gas discharge lamp (HID) of claim 2, wherein the PWM01 signal and the PWM02 signal, and the PWM2 signal and the PWM4 signal have an identical frequency.

5. The control method of the electronic ballast of the gas discharge lamp (HID) of claim 1, wherein frequencies of the PWM1 signal and the PWM3 signal are within 100 Hz, and frequencies of the PWM2 signal and the PWM4 signal are between 10 kHz and 100 kHz.

6. The control method of the electronic ballast of the gas discharge lamp (HID) of claim 2, wherein frequencies of the PWM1 signal and the PWM3 signal are within 100 Hz, and frequencies of the PWM2 signal and the PWM4 signal are between 10 kHz and 100 kHz.

7. The control method of the electronic ballast of the gas discharge lamp (HID) of claim 3, wherein frequencies of the PWM1 signal and the PWM3 signal are within 100 Hz, and frequencies of the PWM2 signal and the PWM4 signal are between 10 kHz and 100 kHz.

8. The control method of the electronic ballast of the gas discharge lamp (HID) of claim 4, wherein frequencies of the PWM1 signal and the PWM3 signal are within 100 Hz, and frequencies of the PWM2 signal and the PWM4 signal are between 10 kHz and 100 kHz.

9. A control circuit of an electronic ballast of a gas discharge lamp (HID), comprising:
a semiconductor full bridge circuit having a left upper arm switch,
a right upper arm switch,
a left lower arm switch,
a right lower arm switch, and
a controller;
wherein the gas discharge lamp (HID) is disposed between a connection point of a left upper arm and a left lower arm and a connection point of a right upper arm and a right lower arm;
wherein the controller is configured to:
generate a PWM1 signal for controlling on/off of the left upper arm switch, a PWM2 signal for controlling on/off of the right upper arm switch, a PWM3 signal for controlling on/off of the left lower arm switch, and a PWM4 signal for controlling on/off of the right lower arm switch from the controller;
generate a control signal for controlling whether a high frequency filtering capacitor is added to both ends of the gas discharge lamp (HID);
collect an output of a detection circuit for detecting a current input into the gas discharge lamp (HID); and determine and set duty ratios of the PWM2 signal and the PWM4 signal.

10. The control circuit of claim 9, wherein the controller further comprises a high frequency PWM signal generator for generating a high frequency PWM01 signal for controlling the left upper arm switch and the right lower arm switch to be connected simultaneously or disconnected simultaneously, and a high frequency PWM02 signal for controlling the right upper arm switch and the left lower arm switch to be connected simultaneously or disconnected simultaneously.

11. The control circuit of claim 10, wherein duty ratios of the PWM01 signal and the PWM02 signal are 50%.

12. The control circuit of claim 10, wherein the PWM01 signal and the PWM02 signal, and the PWM2 signal and the PWM4 signal have an identical frequency.

13. The control circuit of claim 9, wherein frequencies of the PWM1 signal and the PWM3 signal are within 100 Hz, and frequencies of the PWM2 signal and the PWM4 signal are between 10 kHz and 100 kHz.

14. The control circuit of claim 10, wherein frequencies of the PWM1 signal and the PWM3 signal are within 100 Hz, and frequencies of the PWM2 signal and the PWM4 signal are between 10 kHz and 100 kHz.

15. The control circuit of claim 11, wherein frequencies of the PWM1 signal and the PWM3 signal are within 100 Hz, and frequencies of the PWM2 signal and the PWM4 signal are between 10 kHz and 100 kHz.

16. The control circuit of claim 12, wherein frequencies of the PWM1 signal and the PWM3 signal are within 100 Hz, and frequencies of the PWM2 signal and the PWM4 signal are between 10 kHz and 100 kHz.

\* \* \* \* \*